Jan. 27, 1931.  G. ANTANAITIS  1,790,217
OPENER FOR THE VALVES OF INNER AIR TUBES OF PNEUMATIC TIRES
Filed Nov. 10, 1928
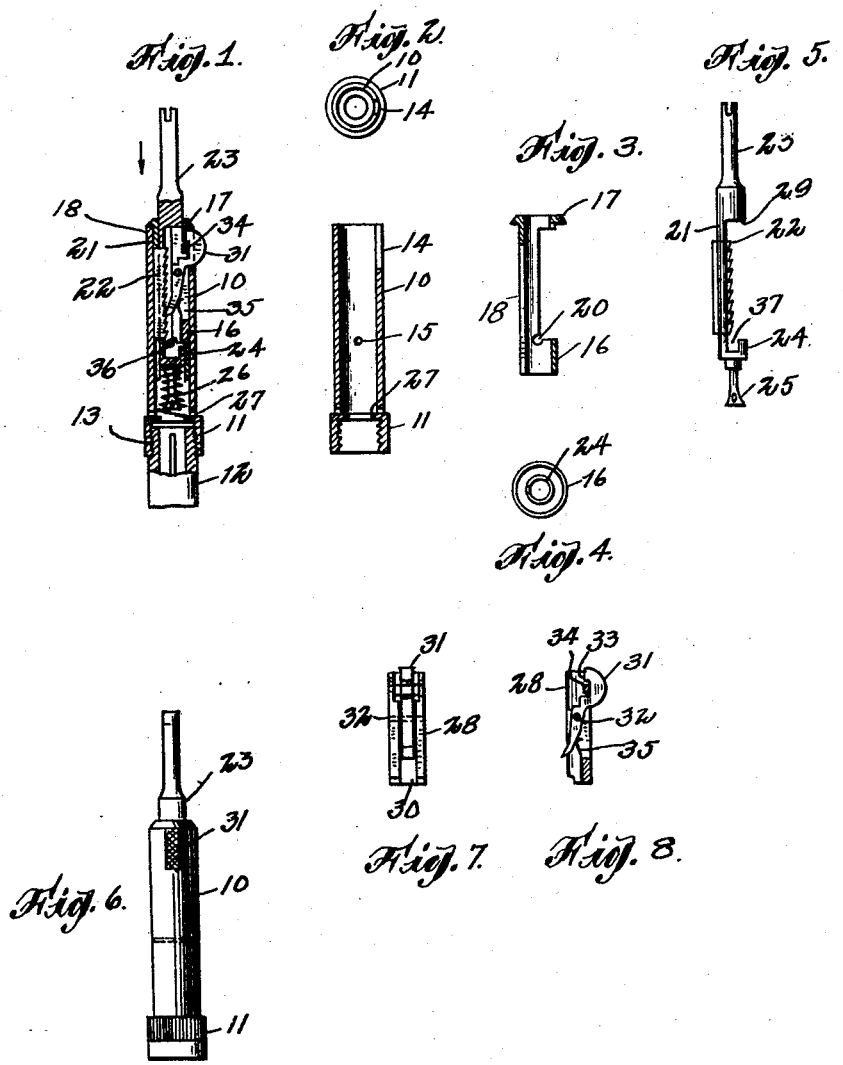
Inventor
George Antanaitis Patented Jan. 27, 1931

1,790,217

UNITED STATES PATENT OFFICE

GEORGE ANTANAITIS, OF MOUNT CARMEL, PENNSYLVANIA

OPENER FOR THE VALVES OF INNER AIR TUBES OF PNEUMATIC TIRES

Application filed November 10, 1928. Serial No. 318,372.

This invention relates to improvements in tools or devices for opening the air valves of the inner tubes of pneumatic tires, and it is the principal object of my invention to provide a device of this character which is equipped with a spring controlled member for operating the stem of the air valve, and with a locking device for said member which can readily be released.

Another object of my invention is the provision of a device of this character equipped with a sliding rack and guide adapted to be engaged by a pawl, while the upward movement of the sliding guide under the action of a spring is limited by suitable means.

These and other objects and advantages of my device will become more fully known when the description proceeds, and will then be specifically pointed out in the appended claim.

In the accompanying drawing, forming a material part of this disclosure:

Fig. 1 is a side elevation of a tool constructed according to my invention, in longitudinal section.

Fig. 2 is a fragmentary front elevation of a sleeve in longitudinal section, and an end elevation thereof.

Fig. 3 is a sectional side elevation of a guide member for the pawl holder.

Fig. 4 is an end view thereof.

Fig. 5 is a side elevation of a rack guide.

Fig. 6 is a front elevation of the device.

Fig. 7 is a front elevation of the pawl holder.

Fig. 8 is a side elevation thereof.

As illustrated, the novel and improved device for opening the air valves of the inner tubes of pneumatic tires, comprises a sleeve 10 having a lower socket 11 integrally made therewith, provided with inner thread adapted to engage the upper outwardly threaded nipple 12 of the tire air valve containing the usual pin or stem 13 for the inner air tube located therein and usually employed to let the air out of an inner tube.

Near its upper end the sleeve 10 has an opening 14 therein, and intermediate its ends a transverse bore 15, both for purposes later to be more fully described.

Within sleeve 10 and longitudinally extending thereto is slidably held a guide member 16 having a head 17, and a body semi-circular in cross-section provided with a longitudinal slot 18, and a shoulder 19 offset at the side opposite to the slotted wall and ending in an open, nearly circular opening 20.

Within the guide member 16, a rack-guide 21 for a rack 22 is slidably guided the rear face of which is engaging the slot 18 in member 16, while its head part 23 is elongated, and its foot part 24 is hook-shaped as indicated in Figure 5, and carries on its underside an operating member 25 for the stem 13 of an air valve, for the inner tube of a pneumatic tire. A spring 26 is wound about said member 25 and rests with its lower end on an inner shoulder 27 of the socket 11.

A pawl holder 28 is adapted to snugly engage with its upper end a shoulder 29 of the guide 21, while its lower end rests on the upper face of pawl 24, and its wall, which is semi-circularly curved in cross-section, engages the front face of guide 21.

The rear wall of the holder 28 is slotted, as at 30, in the slot a pawl 31 is pivoted intermediate its ends, as at 32. The head of the pawl has an inner recess 33 adapted to grip over and engage a bar 34 integrally made with the holder 28, while the lower end of the pawl engages the rack 22 and is held in engagement therewith by means of a spring 35. The head of the pawl 31 projects through plug 14 of the sleeve 10, while a transverse pin 36 is passed through bore 15 and openings 20 and 37 limits the upward movement of the guide 21 and keeps spring 35 compressed.

The operation of my device will be entirely clear from the above description and by inspection of the drawing, and it will be evident, that upon depression of the sliding guide 21 and compression of spring 35, the member 25 will engage the stem 13 of the valve for the inner tube of a pneumatic tire and depress the same to open the valve, while the head 34 of pawl 31 projects through the opening 14 in sleeve 10 and thus locks the parts in their operating position with the lower end of the pawl in engagement with the rack. When a lateral pressure is exerted on pawl 31, to push its head into sleeve 10 through opening 14 thereof its lower end will come free from the rack and the spring can now expand again to push guide 21 again into position for a new operation.

It will be understood that I have described and shown the preferred form of my invention only and that I may make such changes therein as come within the scope of the appended claims without materially departing from my invention.

Having thus described my invention, what I claim as new and desire to secure by Letters Patent is:

In a tire deflator including an outer perforated sleeve engaging the air nipple of the tire, a rack, a holder for said rack, said holder having a longitudinally extending slot in which said rack is displaceably guided, a lower spring controlled stem formed with said holder adapted to engage the stem of the air valve for the inner tube of said tire, a pawl normally projecting through the perforation in said sleeve and engaging said rack, and adapted to be disengaged therefrom upon inward pressure exerted on its projecting part, to allow an expansion of the spring for disengaging stem of the holder from the inner tube valve stem.

Signed at Mount Carmel, in the county of North Cumberland and State of Pennsylvania, A. D. 1928.

GEORGE ANTANAITIS.